United States Patent [19]
Dunn

[11] 3,837,085
[45] Sept. 24, 1974

[54] RANGE-EXTENSION DEVICE FOR DOUBLE-PROBE HOLE-LOCATION AND CONCENTRICITY GAUGE

[75] Inventor: Garf L. Dunn, Farmington, Mich.
[73] Assignee: Zero Gage Company, Detroit, Mich.
[22] Filed: Dec. 13, 1971
[21] Appl. No.: 207,330

[52] U.S. Cl. ............................ 33/174 Q, 33/169 R
[51] Int. Cl. ......................... G01b 5/00, G01b 5/24
[58] Field of Search .......... 33/174 Q, 174 R, 172 R, 33/169 R, 178 R, 143 R, 143 G, 143 H, 147 R, 147 F, 147 H, 147 J, 147 G, 147 K, 147 L

[56] References Cited
UNITED STATES PATENTS

| | | | |
|---|---|---|---|
| 2,581,473 | 1/1952 | Eisele | 33/178 R |
| 2,604,707 | 7/1952 | Meyer | 33/178 R |
| 3,046,665 | 7/1962 | Nilsson | 33/172 R |
| 3,209,460 | 10/1965 | Eisele | 33/174 Q |
| 3,732,624 | 5/1973 | Eisele | 33/174 Q |

Primary Examiner—John W. Huckert
Assistant Examiner—John M. Jillions
Attorney, Agent, or Firm—Willis Bugbee

[57] ABSTRACT

This device extends the range of measurement to bores or surfaces incapable of being reached or measured by the gauge disclosed and claimed in U.S. Pat. No. 3,732,624, issued May 15, 1973, on the co-pending application of Andrew Eisele, Ser. No. 191,041, filed Oct. 20, 1971 for Double-Probe Hole-Location and Concentricity-Measuring Spindle for Dial Indicator Gauge. The latter, briefly described, consists of a hollow shaft or barrel with an external pilot surface adapted to be fitted into the reference bore of a gauge-holding fixture, and with two axially-spaced parallel transverse bores containing transversely slidable probes alternately connectible to a longitudinal motion-transmitting rod, the rearward end of which operatively engages the plunger of a dial indicator carried by a rotatable holder mounted on the hollow shaft.

1 Claim, 5 Drawing Figures

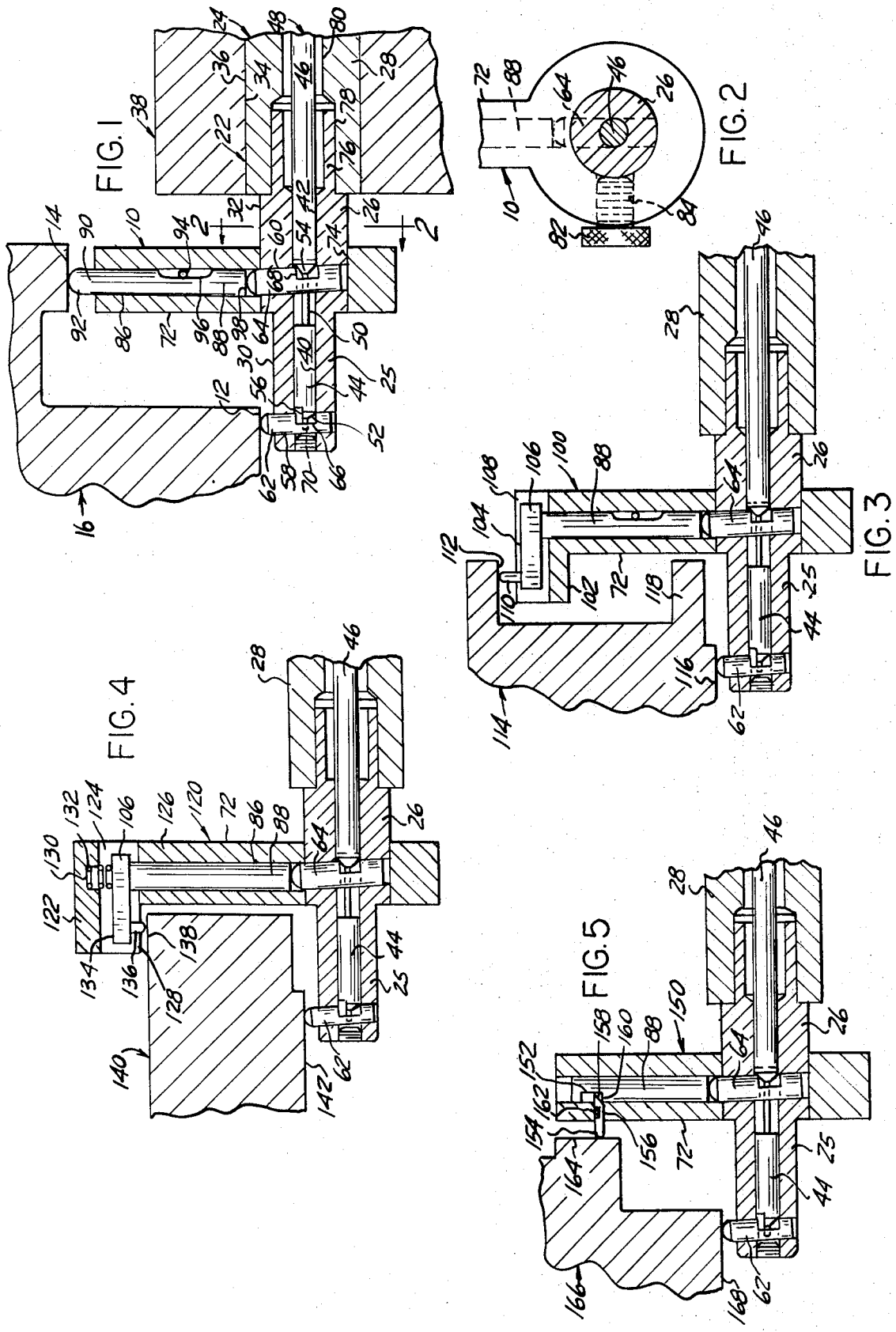

RANGE-EXTENSION DEVICE FOR DOUBLE-PROBE HOLE-LOCATION AND CONCENTRICITY GAUGE

The first form of the device (FIG. 1) consists of a bracket attachable to the hollow shaft or barrel in line with the first or rearward probe and containing a transverse bore within which is slidably and retainedly mounted an auxiliary probe, the rounded outer end of which is engageable with a large diameter bore while the inner end engages the first or rearward probe of the main gauge. The second form (FIG. 3) modifies the first form by adding an offset arm to the first form auxiliary probe and has an outwardly-directed offset auxiliary probe mounted thereon and is adapted to gauge an internal surface located beyond an intervening obstacle. The third form (FIG. 4) generally resembles the second form, except that the offset probe is inwardly directed and is adapted to gauge an external surface located beyond an intervening obstacle. The fourth form (FIG. 5) generally resembles the first form except that the rounded end is omitted from the auxiliary probe, which becomes a notched transverse motion-transmitting rod with the sharp edge of the notch engaging the oblique inner end of an auxiliary probe disposed parallel to the shaft axis and having a rounded outer end engageable with a face surface perpendicular to the axis of the bore engaged by the forward or second probe of the main gauge.

In the drawing,

FIG. 1 is a central longitudinal section through the forward end of a double-probe hole-location and concentricity-measuring spindle with the first form of range-extension device mounted thereon, according to the invention;

FIG. 2 is a cross-section taken along the line 2—2 in FIG. 1;

FIG. 3 is a similar view with the second form of range-extension device similarly mounted; and FIG. 4 is a similar view with the third form of range-extension device similarly mounted; and FIG. 5 is a similar view with the fourth form of range-extension device similarly mounted.

Referring to the drawing in detail, FIG. 1 shows a range-extension device, generally designated 10, according to one form of the invention, as mounted on the forward end of a measuring spindle 22 of the double-probe hole-location and concentricity-measuring gauge disclosed and claimed in U.S. Pat. No. 3,732,624, issued May 15, 1973, on the co-pending application of Andrew Eisele, Ser. No. 191,041, filed Oct. 20, 1971 for Double-Probe Hole-Location and Concentricity-Measuring Spindle for Dial Indicator Gauge for measuring the accuracy of location of a large-diameter workpiece hole or bore 14 relatively to a smaller diameter hole or bore 12 in a workpiece, generally designated 16. Briefly described, the measuring spindle 22 consists of a composite hollow shaft or barrel 24 made up of forward, intermediate and rearward components 25, 26 and 28 of successively increasing diameters with external forward, intermediate and rearward cylindrical surfaces 30, 32 and 34 respectively. The rearward cylindrical external surface 34 is a cylindrical pilot surface which is adapted to snugly but rotatably fit a reference bore 36 in a conventional stationary master fixture, generally designated 38.

The master fixture 38 is shown diagrammatically to simplify the disclosure, whereas in actual practice the bore 36 is contained in a hardened steel bearing bushing (not shown) which in turn is mounted in a larger bore in the master fixture 38. The master fixture 38 is fixedly mounted and has associated therewith means for holding the workpiece 16 in a predetermined position relatively to the bore 36 of the master fixture 38 such that the spindle 22 of the main dial indicator gauge (not shown) is coaxial with the intended common axis of the bores or holes 12 and 14. The spindle 22 is provided with coaxial bores 40 and 42 of increasing diameters in which are slidably mounted the forward and rearward portions 44 and 46 of a longitudinal motion-transmitting rod, generally designated 48 and having the portions 44 and 46 interconnected by a reduced diameter portion 50. The outer ends of the rod portions 44 and 46 terminate in half conical portions 52 and 54 having flat-bottomed clearance notches 56 rotated 90° relative to one another. The forward and intermediate portions 25 and 26 are provided with transverse bores 58 and 60 inclined slightly to the axis of the bores 40 and 42 but with their axes parallel to one another. Mounted in the transverse bores 58 and 60 are forward and rearward round headed probes 62 and 64 respectively provided with sharp edged slots 66 and 68, the probe 64 of which is engageable with its respective conical cam portion 54 while the other probe 62 is disengaged from its conical cam portion 52 by its clearance notch 56. The probes 62 and 64 in line with their slots 66 and 68 are drilled for the passage of a reduced diameter rod end 70 and the intermediate rod portion 50 respectively. Means (not shown) is provided for rotating the motion transmitting rod 48 to present the cam portions 52 and 54 thereof alternately to their respective sharp edged slots 66 or 68 so as to activate the one and simultaneously inactivate the other. The motion-transmitting rod 48 at its rearward end engages the operating plunger of a conventional dial indicator (not shown) but well known to those skilled in the mechanical arts. Means is also provided for rotating the measuring spindle 22 relatively to the dial indicator for keeping the dial indicator stationary as the probes 62 and 64 sweep their respective workpiece bores 12 and 14, the probe 64 being assisted in making such contact by the range extension device 10 described immediately below.

The range extension device 10 consists of a bracket 72 provided with a mounting bore 74 adapted to slide upon and snugly fit the cylindrical surface 32 of the shaft portion 26, which in turn has a reduced diameter portion 76 snugly fitting and secured within a counterbore 78 in the rearward hollow shaft portion 28, the counterbore 78 in turn opening into a clearance bore 80.

The bracket 72 (FIG. 2) is held in position on the intermediate shaft portion 26 by a thumb screw 82 threaded into a threaded bore 84 in one side of the bracket 72 and disposed radial to the shaft portion 26. The bracket 72 is provided with a longitudinal bearing bore at 86 to receive a transverse motion-transmitting rod 88 provided with a probe 90 integral therewith and having a rounded end 92 which engages the workpiece bore 14. The bracket 72 is drilled to one side of the bore 86 to receive a pin 94 engaging an elongated longitudinal slot 96 in the rod 88 for preventing rotation of the probe 90 as well as retaining the rod 88 in the bracket bore 86.

In the operation of the range extension device 10, let it be assumed that the thumb screw 82 has been loosened and the bore 74 of the bracket 72 has been slid onto the cylindrical surface 32 of the intermediate portion 26 of the hollow shaft 24. The operator adjusts the bracket 72 back and forth along the surface 32 until the bracket bore 86 is aligned with the end of the probe 64 and the inner end 98 of the transverse motion-transmitting rod 88 engages the rounded outer end of the second main probe 64. The operator then tightens the thumb screw 82 to clamp the bracket 72 upon the shaft portion 26. In this situation, the rounded end 92 of the auxiliary probe 90 on the outer end of the transverse motion-transmitting rod 88 engages the large diameter bore 14 while the rounded outer end of the first main probe 62 engages the small diameter bore 12. The operator then rotates the spindle 22 by means of the handle portion of the dial indicator holder (not shown), thereby causing the outer ends of the first main probe 62 and auxiliary probe 90 to trace out arcuate paths on their respective bores 12 or 14. If these bores are in the proper location relatively to the axis of the reference bore 36 engaged by the pilot surface 34 of the spindle 24, the needle of the dial indicator remains motionless. If, on the other hand, either or both of the bores 12 and 14 are not in their proper locations, the motion of the probe 62 or 90 communicated to the longitudinal motion-transmitting rod by the sharp-edged notches 66 or 68 engaging their respective conical cam surfaces 52 or 54, the consequent longitudinal motion of the longitudinal motion-transmitting rod 48 applied to the plunger of the dial indicator causes the needle thereof to swing to and fro from its zero point on its divided scale, thereby indicating the amount of mislocation of either bore 12 or 14 of the workpiece 16. The range extension device 10 can easily be removed from the intermediate portion 26 of the hollow shaft 24 by loosening the thumb screw 82 and sliding the device 10 off the intermediate surface 32 of the hollow shaft 24, whereupon the measuring spindle 22 may be again used for the making of hole location or concentricity measurements within the range of travel of its first and second main probe 62 and 64.

The second form of range extension device in the laterally-offset, outwardly-facing probe, generally designated 100, shown in FIG. 3, is similar to the first device 10 in all respects except for the offset construction of its outer end, hence similar parts in FIG. 3 are designated by the same reference numerals as in FIG. 1. In the FIG. 3, however, the bracket 72 is provided with a lateral end extension 102 which makes it of L-shaped form. The transverse motion-transmitting rod 88 is similarly provided with a laterally-offset arm 104 with flat parallel opposite sides 106 seated in a parallel-sided outwardly-facing guide channel 108 which the arm sides 106 snugly but slidably engage. Mounted on the outer end of the arm 104 is a round-ended probe 110 directed outward parallel to the rod 88 so as to engage a large-diameter internal surface 112 on a workpiece 114 also having small diameter bore 116 therein similar to the bore 12 of FIG. 1. The workpiece 114 has an axially-projecting portion 118 which acts as an obstacle preventing successful use of the range-extension device 10 of FIG. 1 but enabling the use of the range extension device 100 of FIG. 3. The installation, clamping and operation of the offset range extension device 100 of FIG. 3 are generally similar to those already described in connection with FIG. 1 and hence require no further description.

The third form of range extension device with the laterally-offset inwardly-facing probe, generally designated 120, shown in FIG. 4, is also similar to the first and second devices 10 and 100 shown in FIGS. 1 and 3, hence similar parts are also designated with the same reference numerals as in FIGS. 1 and 3. In FIG. 4, however, the bracket 72 is provided with a lateral end extension 122 of L-shaped form but with a parallel-flat-sided guide slot 124 through it. The guide slot 124, however, beyond the portion 126 of the bracket 72 constituting the main portion thereof is open at 128 on its inner side so as to provide, in effect, an inwardly-facing channel in that part of the slot 124. The arm 122 inside the bore 124 and in line with the bracket bore 86 is provided with a recess or socket 130 within which is seated the outer end of a compression coil spring 132, the inner end of which engages the upper surface 134 of the offset arm 122. Secured to the arm 106 and projecting inwardly through the opening 128 is a round-ended probe 136 which is adapted to engage the large-diameter cylindrical external surface 138 of a workpiece 140 having a smaller diameter bore 142 therein corresponding to the workpiece bores 12 and 116 of the workpieces 16 and 114 of FIGS. 1 and 3 respectively. The installation and operation of the laterally-offset inwardly-facing range extension device 120 of FIG. 4 are also generally similar to those of FIGS. 1 and 3 and hence is believed to require no further description.

The fourth form of range extension device with the laterally-offset axially-facing probe, generally designated 150, shown in FIG. 5 is also similar to the first device 10 shown in FIG. 1, and likewise differs therefrom only in the construction at its outer end, for measuring a different type of workpiece. Similar parts are therefore designated with the same reference numerals. In the range extension device 150 of FIG. 5, the elongated slot 96 and pin 94 for the transverse motion-transmitting rod 88 are replaced by a sharp-edged notch 152 near the outer end thereof, and by an axially-facing round-ended probe 154 mounted in a side wall bore 156 of the bracket 72. The probe 154 has an inclined or beveled end 158 which is engaged by the sharp lower edge 160 of the notch 152. The probe 154 is also longitudinally-slotted and the bracket 72 cross-drilled to one side of the bore 156 to receive a pin 162 for preventing rotation of the probe 154. The installation and operation of the range extension device 150 with the axially-facing probe 154 are also generally similar to those of FIGS. 1, 3 and 4, except that the device 150 is intended for the measurement of the squareness, i.e., perpendicularity, of the face 164 of the workpiece 166 relatively to the axis of the reference bore 36 in the master fixture 38 (FIG. 1). The workpiece 166, like the workpieces 16, 114 and 140 of FIGS. 1, 3 and 4 respectively, is provided with a smaller diameter bore 168 which is measured in the same manner as the corresponding small diameter bores 12, 116 and 142 of the workpieces 16, 114 and 140 of FIGS. 1, 3 and 4 respectively are measured.

I claim:

1. The combination with a dial indicator bore and counterbore measurement gauge having a barrel with a forward portion containing a forward probe and a larger diameter intermediate portion disposed rearwardly of said forward portion and containing a rearward probe spaced longitudinally apart from said forward probe along said barrel, of
- a bracket having an opening therethrough of larger diameter than said forward portion fitted onto said larger diameter intermediate portion of said barrel in alignment with said rearward probe and having a bearing bore therein with the axis thereof disposed substantially perpendicular to the axis of said opening,
- means for releasably securing said bracket to said barrel in alignment with said rearward probe,
- a transverse motion-transmitting element slidably mounted in said bearing bore and having an inner end adapted to operatively engage the rearward gauge probe and an outer end portion disposed remote therefrom,
- and auxiliary probe means operatively connected to said outer end portion of said transverse motion-transmitting element and adapted to extend into measuring engagement with a workpiece surface otherwise inaccessible to the rearward gauge probe,
- said auxiliary probe means including a probe bore in said bracket disposed substantially at right angles to said bracket bearing bore, also including an auxiliary probe slidably mounted in said probe bore, and also including means interposed between said auxiliary probe and said transverse motion-transmitting element for converting sliding motion of said auxiliary probe into sliding motion of said transverse motion-transmitting element perpendicular to the sliding motion of said auxiliary probe.

* * * * *